US010629165B2

(12) United States Patent
Chan et al.

(10) Patent No.: US 10,629,165 B2
(45) Date of Patent: Apr. 21, 2020

(54) WEARABLE DEVICES AND METHODS FOR MANUFACTURING A WEARABLE DEVICE

(71) Applicant: RAZER (ASIA-PACIFIC) PTE. LTD., Singapore (SG)

(72) Inventors: Chee Oei Chan, Singapore (SG); Jian Yao Lien, Singapore (SG); Kah Yong Lee, Singapore (SG); Joel Sze Wei Hong, Singapore (SG); Farrukh Raza Rizvi, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/303,691

(22) PCT Filed: May 23, 2016

(86) PCT No.: PCT/SG2016/050243

§ 371 (c)(1),
(2) Date: Nov. 21, 2018

(87) PCT Pub. No.: WO2017/204744

PCT Pub. Date: Nov. 30, 2017

(65) Prior Publication Data

US 2019/0341005 A1 Nov. 7, 2019

(51) Int. Cl.

| | |
|---|---|
| ***G09G 5/14*** | (2006.01) |
| ***G04G 9/00*** | (2006.01) |
| ***G04G 17/04*** | (2006.01) |
| ***G09G 3/18*** | (2006.01) |
| ***G09G 3/20*** | (2006.01) |

(Continued)

(52) U.S. Cl.

CPC ............... *G09G 5/14* (2013.01); *G04G 9/007* (2013.01); *G04G 17/045* (2013.01); *G09G 3/18* (2013.01); *G09G 3/20* (2013.01); *G09G 3/32* (2013.01); *G09G 3/3208* (2013.01); *G09G 3/36* (2013.01);

(Continued)

(58) Field of Classification Search

None

See application file for complete search history.

(56) References Cited

U.S. PATENT DOCUMENTS 4,026,101 A 5/1977 Moyer
4,573,766 A 3/1986 Bournay, Jr. et al.

(Continued)

FOREIGN PATENT DOCUMENTS

CN 102610193 A 7/2012
CN 105209981 A 12/2015

(Continued)

OTHER PUBLICATIONS

Examination Report dated Dec. 13, 2018, for the corresponding Australian Application No. 2016408326 in 6 pages.

(Continued)

*Primary Examiner* — Christopher J Kohlman
(74) *Attorney, Agent, or Firm* — Polsinelli PC

(57) ABSTRACT

According to various embodiments, a wearable device may be provided. The wearable device may include: a display panel having integrally formed a first display portion and a second display portion; and a driver circuit configured to control the first display portion with a first frequency and to control the second display portion with a second frequency.

12 Claims, 6 Drawing Sheets

(51) Int. Cl.
*G09G 3/32* (2016.01)
*G09G 3/3208* (2016.01)
*G09G 3/36* (2006.01)

(52) U.S. Cl.
CPC ... *G09G 2330/021* (2013.01); *G09G 2360/04* (2013.01)

(56) References Cited

U.S. PATENT DOCUMENTS

| | | | | |
|---|---|---|---|---|
| 5,781,913 | A | 7/1998 | Felsenstein et al. | |
| 5,881,299 | A * | 3/1999 | Nomura | G06F 1/3218 713/324 |
| 6,118,439 | A * | 9/2000 | Ho | G09G 3/18 345/211 |
| 7,406,338 | B2 | 7/2008 | Chen | |
| 7,742,012 | B2 | 6/2010 | Yuan et al. | |
| 8,830,392 | B2 | 9/2014 | Li | |
| 9,141,329 | B1 * | 9/2015 | Reicher | G06F 3/1446 |
| 2002/0158812 | A1 | 10/2002 | Pallakoff | |
| 2005/0253773 | A1 | 11/2005 | Sekiguchi | |
| 2006/0066227 | A1 | 3/2006 | Virnich et al. | |
| 2007/0120763 | A1 | 5/2007 | De Paepe et al. | |
| 2008/0247128 | A1 | 10/2008 | Khoo | |
| 2009/0146913 | A1 | 6/2009 | Tanabe | |
| 2009/0315822 | A1 | 12/2009 | Biebel et al. | |
| 2011/0001687 | A1 | 1/2011 | Srinivasan et al. | |
| 2012/0162269 | A1 | 6/2012 | Bohn et al. | |
| 2013/0141310 | A1 | 6/2013 | Joo | |
| 2013/0187962 | A1 | 7/2013 | Vieri et al. | |
| 2013/0201176 | A1 | 8/2013 | Lee et al. | |
| 2015/0067366 | A1 * | 3/2015 | Lai | G06F 1/3293 713/320 |
| 2015/0243203 | A1 | 8/2015 | Kim et al. | |
| 2015/0293738 | A1 | 10/2015 | Lee | |
| 2016/0058133 | A1 | 3/2016 | Fournier | |
| 2016/0202997 | A1 * | 7/2016 | Lay | G06F 1/3287 713/2 |
| 2016/0253974 | A1 * | 9/2016 | Fellinger | G02F 1/13306 345/208 |
| 2016/0275919 | A1 * | 9/2016 | Lawrence | G09G 5/39 |
| 2017/0082982 | A1 * | 3/2017 | Cho | G04G 9/0064 |
| 2017/0338570 | A1 * | 11/2017 | Myers | H04B 1/00 |

FOREIGN PATENT DOCUMENTS

| | | | |
|---|---|---|---|
| GB | 2075726 | A1 | 11/1981 |
| GB | 2414883 | A | 12/2005 |
| JP | 06-289168 | A | 10/1994 |
| KR | 10-2006-0041968 | A | 5/2006 |
| KR | 10-1525330 | B1 | 6/2015 |
| KR | 10-2015-0089994 | A | 8/2015 |

OTHER PUBLICATIONS

Office Action (including English Translation) dated May 29, 2019, for the corresponding Chinese Application No. 201680086037.8 in 12 total pages.

International Search Report and Written Opinion, dated Feb. 14, 2017, for the corresponding International Application No. PCT/SG2016/050243 in 8 pages.

Extended European Search Report dated Jan. 29, 2019, 10 pages, for the corresponding European Patent Application No. 16903301.6.

Office Action (including English Translation) dated Oct. 8, 2019, for the corresponding Chinese Application No. 201680086037.8 in 10 total pages.

Examination Report dated Aug. 29, 2019, 5 pages, for the corresponding Australian Patent Application No. 2016408326.

* cited by examiner

WEARABLE DEVICES AND METHODS FOR MANUFACTURING A WEARABLE DEVICE

TECHNICAL FIELD

Various embodiments generally relate to wearable devices and methods for manufacturing a wearable device.

BACKGROUND

Various devices, for example the current Razer Nabu watch, may use two independent display units: one OLED (organic light-emitting diode) unit and one LCD (liquid-crystal display) unit. For example, the OLED may display notifications received from a smartphone and may use high current. The OLED may require a high refresh rate. The LCD display may be used in current LCD watch technology for display of time and date. However, having two independent display units may not provide uniform color distribution and under the same lighting condition, so that one display unit may be bright and the other display unit may be dim. Thus, there may be a need for an improvement.

SUMMARY OF THE INVENTION

According to various embodiments, a wearable device may be provided. The wearable device may include: a display panel having integrally formed a first display portion and a second display portion; and a driver circuit configured to control the first display portion with a first frequency and to control the second display portion with a second frequency.

According to various embodiments, a method for manufacturing a wearable device may be provided. The method may include: integrally forming a display panel having a first display portion and a second display portion; and forming a driver circuit for controlling the first display portion with a first frequency and for controlling the second display portion with a second frequency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1A:
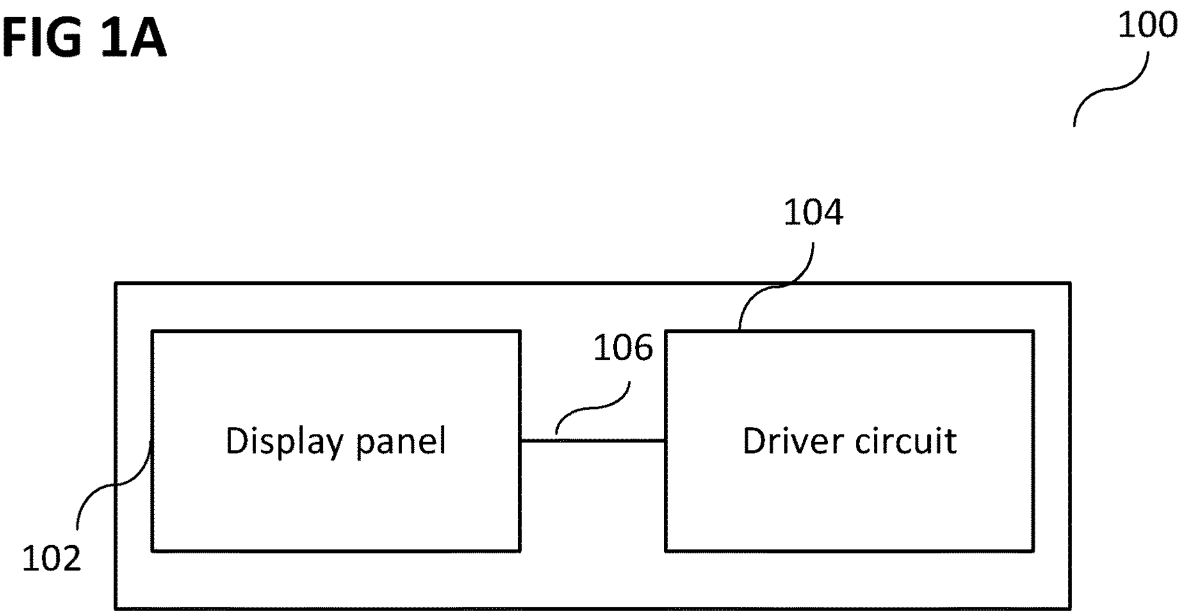
FIG. 1A shows a wearable device according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the wearable device as described in this description may include a memory which is for example used in the processing carried out in the wearable device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a “circuit” may be understood as any kind of a logic implementing entity, which may be special purpose circuitry or a processor executing software stored in a memory, firmware, or any combination thereof. Thus, in an embodiment, a “circuit” may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A “circuit” may also be a processor executing software, e.g. any kind of computer program, e.g. a computer program using a virtual machine code such as e.g. Java. Any other kind of implementation of the respective functions which will be described in more detail below may also be understood as a “circuit” in accordance with an alternative embodiment.

In the specification the term “comprising” shall be understood to have a broad meaning similar to the term “including” and will be understood to imply the inclusion of a stated integer or step or group of integers or steps but not the exclusion of any other integer or step or group of integers or steps. This definition also applies to variations on the term “comprising” such as “comprise” and “comprises”.

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term “coupled” (or “connected”) herein may be understood as electrically coupled or as mechanically coupled, for example attached or fixed, or just in contact without any fixation, and it will be understood that both direct coupling or indirect coupling (in other words: coupling without direct contact) may be provided.

Various devices, for example the current Razer Nabu watch, may use two independent display units: one OLED (organic light-emitting diode) unit and one LCD (liquid-crystal display) unit. For example, the OLED may display notifications received from a smartphone and may use high current. The OLED may require a high refresh rate. The LCD display may be used in current LCD watch technology for display of time and date.

Having two independent display units may not provide uniform color distribution and under the same lighting condition, so that one display unit may be bright and the other display unit may be dim.

According to various embodiments, a single panel LCD with notification display may be provided.

According to various embodiments, a single integrated panel that incorporates both LCD and LED (light-emitting diode) displays that is at least partly driven by an IC (integrated circuit) that provides high current (and/or high refresh rate) and another portion of the display that uses low current (and/or a low refresh rate).

FIG. 1A shows a wearable device 100 (for example a watch, for example smart watch, or for example a smart (wrist) band) according to various embodiments. The wearable device 100 may include a display panel 102 having integrally formed a first display portion and a second display portion. The wearable device 100 may further include a driver circuit 104 configured to control the first display portion with a first frequency and to control the second display portion with a second frequency. The display panel 102 and the driver circuit 104 may be coupled with each other, like indicated by line 106, for example electrically coupled, for example using a line or a cable, and/or mechanically coupled.

In other words, a wearable device 100 may include a single display panel 102, which includes portions which are controlled with different frequencies.

It will be understood that frequency (for example the first frequency or the second frequency) refers to (in other words: is another term for) refresh rate of the respective portion (first display portion or second display portion) of the display panel 102. The first frequency may be lower than the second frequency.

According to various embodiments, the driver circuit 104 may be configured to provide a first power to the first display portion and a second power to the second display portion, wherein the first power is lower than the second power.

According to various embodiments, the first power may be in a range of 1 uA to 10 uA (for example with an operating voltage of 1.0 V to 3.6 V.

According to various embodiments, the second power may be in a range of 100 uA to 300 uA (for example with an operating voltage of 2.5 V to 5 V).

According to various embodiments, the first frequency may be up to 64 Hz.

According to various embodiments, the second frequency may up to 120 Hz (for example when driving a full matrix display).

According to various embodiments, the first display portion may include (or may work according to) a liquid-crystal display technology.

According to various embodiments, the second display portion may include (or may work according to) a liquid-crystal display technology.

According to various embodiments, the second display portion may include (or may work according to) a light-emitting diode technology.

According to various embodiments, the second display portion may include (or may work according to) an organic light-emitting diode technology.

According to various embodiments, the driver circuit 104 may be integrally formed for the first display portion and the second display portion.

According to various embodiments, the driver circuit 104 may include or may be or may be included in a chip-on-film or chip-on-flex or chip-on-glass.

According to various embodiments, the first display portion and the second display portion may be configured to be backlit by a common backlight or dedicated portion.

According to various embodiments, the first display portion may be configured to display a watch function.

According to various embodiments, the second display portion may be configured to display a smart watch function.

Figure 1B:
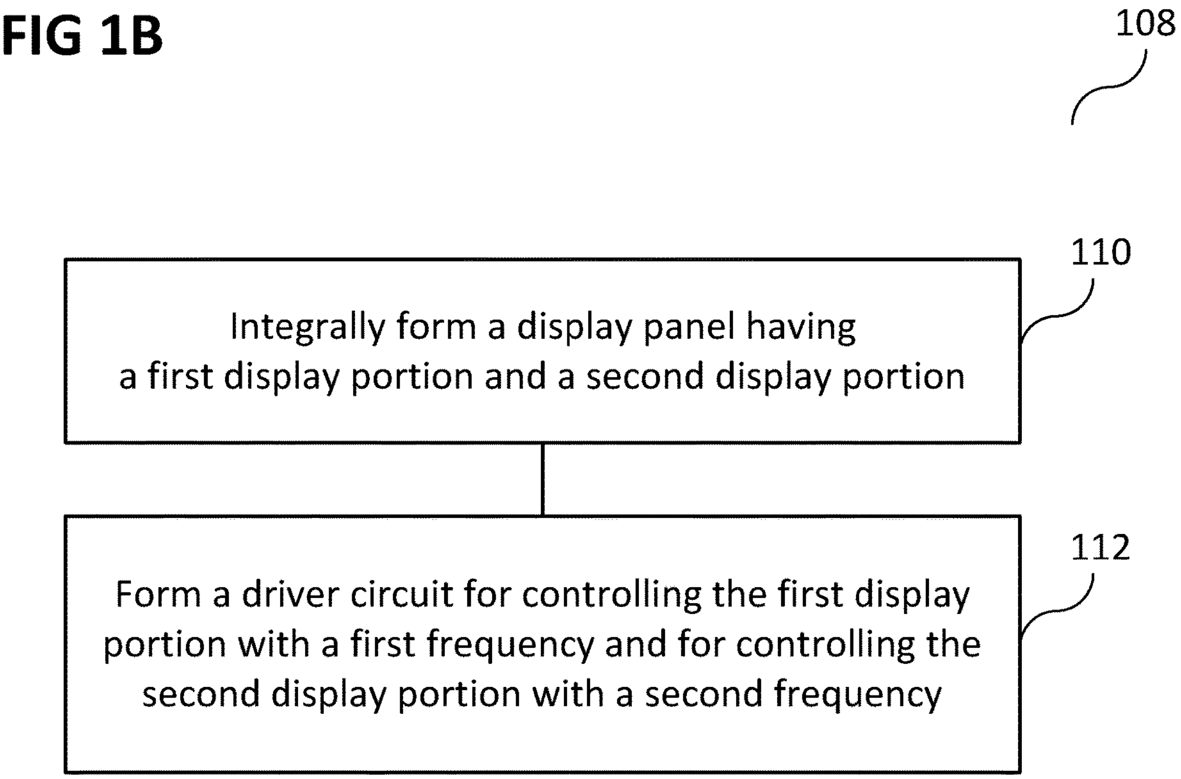
FIG. 1B shows a flow diagram illustrating a method for manufacturing a wearable device according to various embodiments.

FIG. 1B shows a flow diagram 108 illustrating a method for manufacturing a wearable device according to various embodiments. In 110, a display panel may be integrally formed to have a first display portion and a second display portion. In 112, a driver circuit may be formed for controlling the first display portion with a first frequency and for controlling the second display portion with a second frequency.

According to various embodiments, the driver circuit may be formed to provide a first power to the first display portion and a second power to the second display portion, wherein the first power is lower than the second power.

According to various embodiments, the first power may be in a range of 1 uA to 10 uA (for example with an operating voltage of 1.0 V to 3.6 V).

According to various embodiments, the second power may be in a range of 100 uA to 300 uA (for example with an operating voltage of 2.5 V to 5 V).

According to various embodiments, the first frequency may be up to 64 Hz.

According to various embodiments, the second frequency may be up to 120 Hz (for example when driving a full matrix display).

According to various embodiments, the first display portion may be formed according to a liquid-crystal display technology.

According to various embodiments, the second display portion may be formed according to a liquid-crystal display technology.

According to various embodiments, the second display portion may be formed according to a light-emitting diode technology.

According to various embodiments, the second display portion may be formed according to an organic light-emitting diode technology.

According to various embodiments, the driver circuit may be integrally formed for the first display portion and the second display portion.

According to various embodiments, the driver circuit may be formed according to a chip-on-film technology or chip-on-flex technology or chip-on-glass technology.

According to various embodiments, the first display portion and the second display portion may be formed to be backlit by a common backlight or dedicated portion.

According to various embodiments, the first display portion may be formed to display a watch function.

According to various embodiments, the second display portion may be formed to display a smart watch function.

In the following, a comparison of alignment between a watch with a dual panel display and a watch with a single panel display according to various embodiments will be described.

Figure 2A:
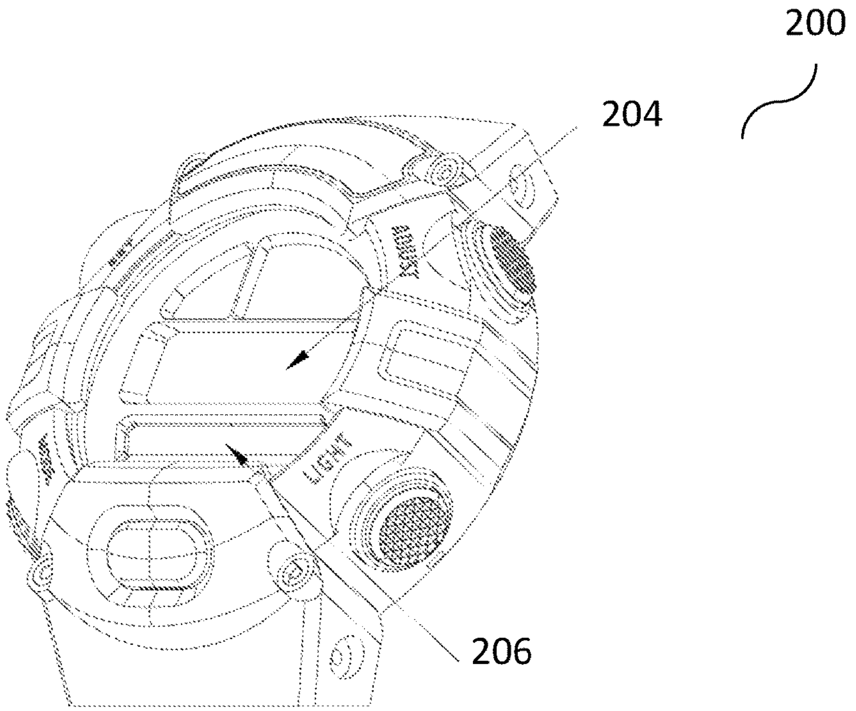
FIG. 2A shows a watch with a dual panel display.

FIG. 2A shows a watch 200 with a dual panel display.

Figure 2B:
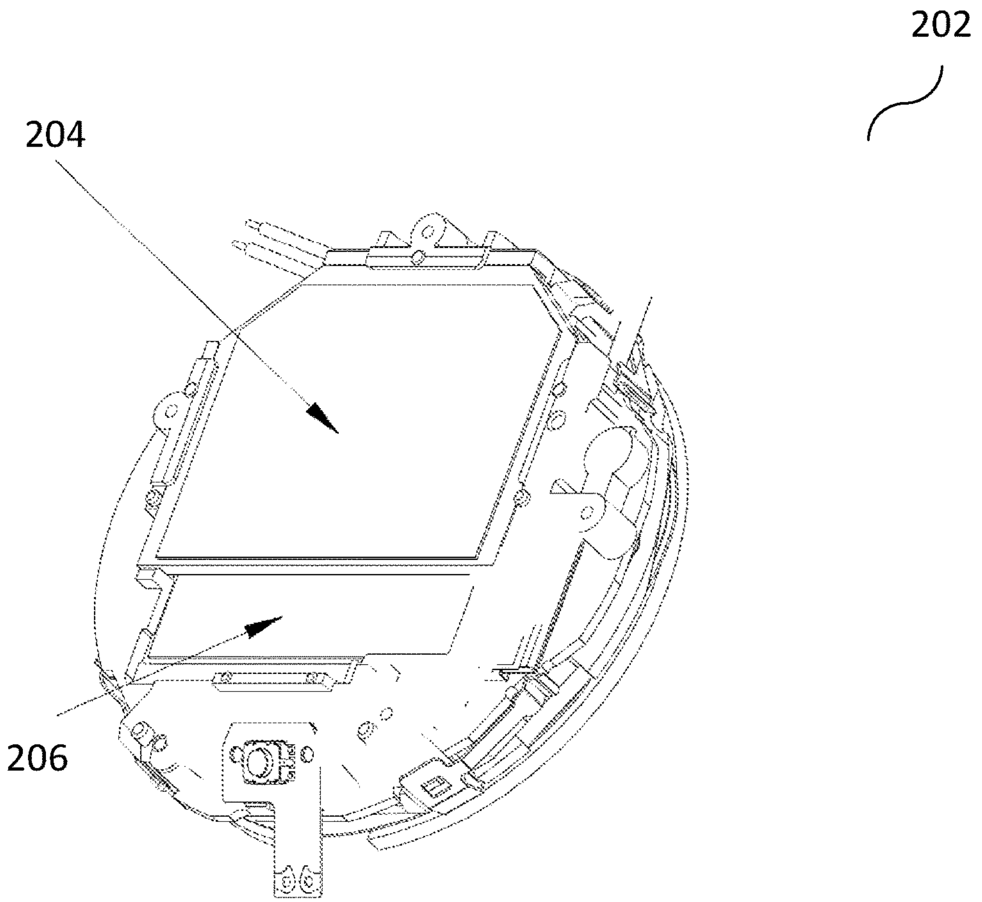
FIG. 2B shows an internal component of the watch with a dual panel display.

FIG. 2B shows an internal component 202 of the watch 200 with a dual panel display. The LCD 204 and the OLED 206 are shown.

Figure 3A:
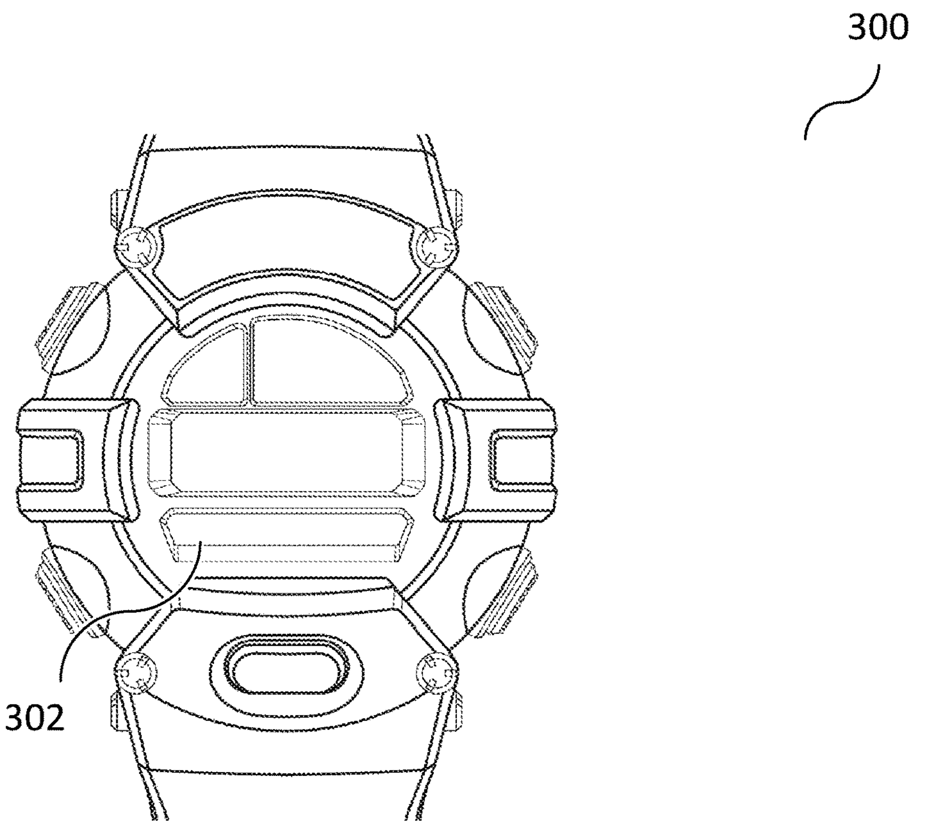
FIG. 3A shows a watch with a single panel display according to various embodiments.

FIG. 3A shows a watch 300 with a single panel display according to various embodiments. Compared to a watch with a dual panel display (for example like shown in FIG. 2A), the OLED window 302 of the watch 300 with a single panel display according to various embodiments may be shifted upward, for example by 0.30 mm.

Figure 3B:
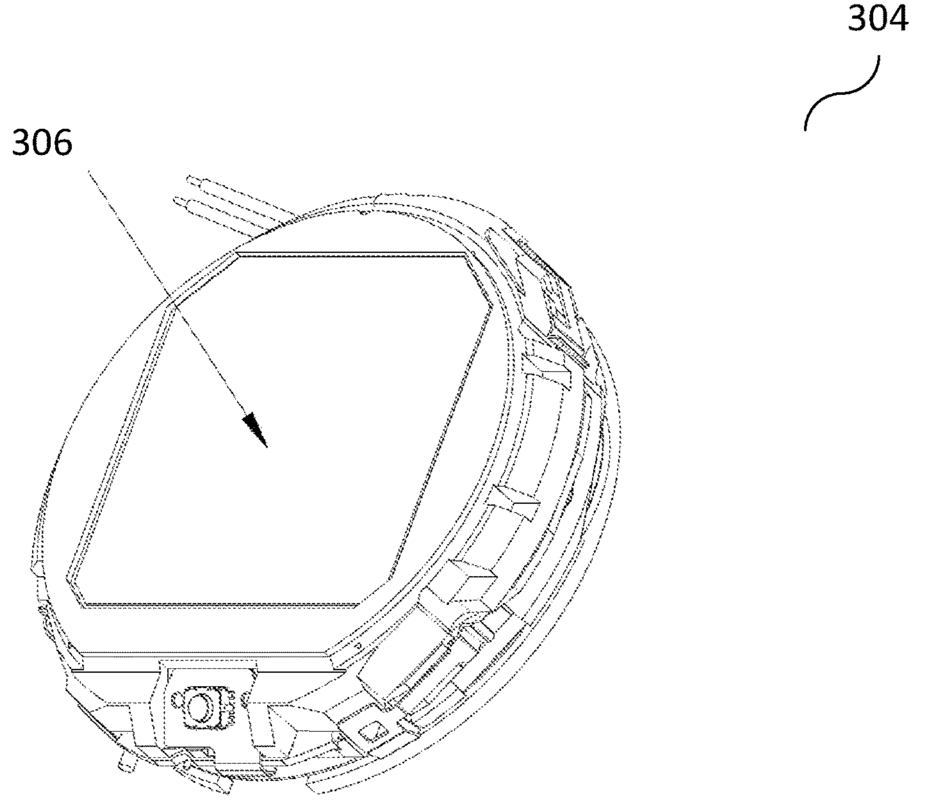
FIG. 3B shows an internal component of the watch with a single panel display according to various embodiments.
Figure 3C:
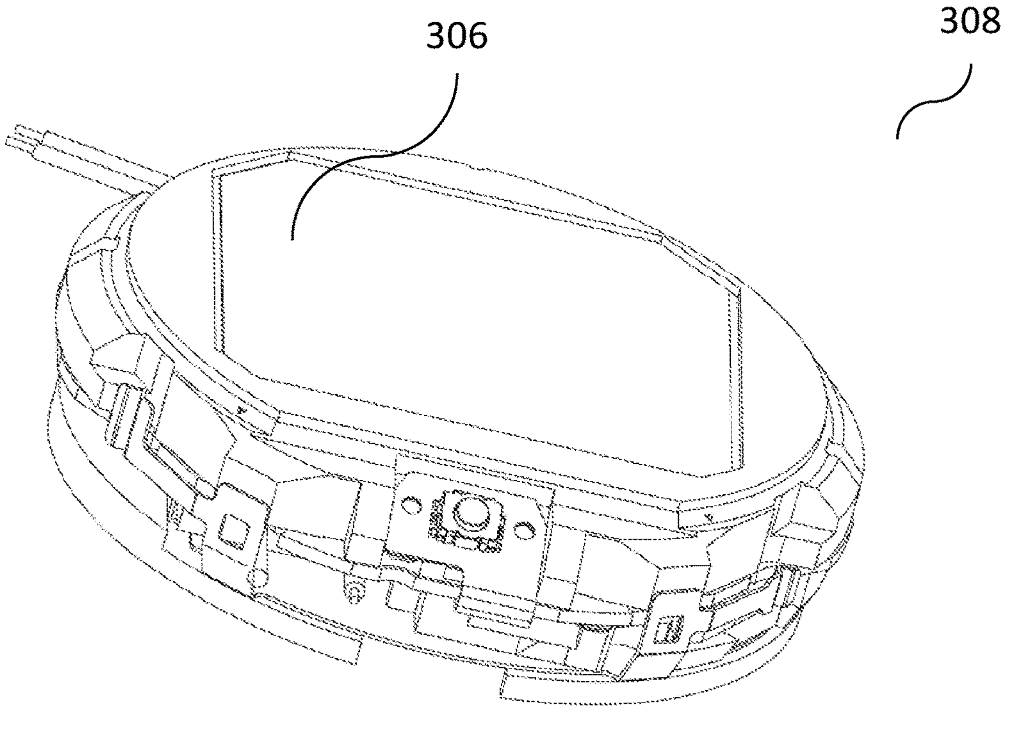
FIG. 3C, FIG. 3D, FIG. 3E, and FIG. 3F show further views of a single LCD panel according to various embodiments.
Figure 3D:
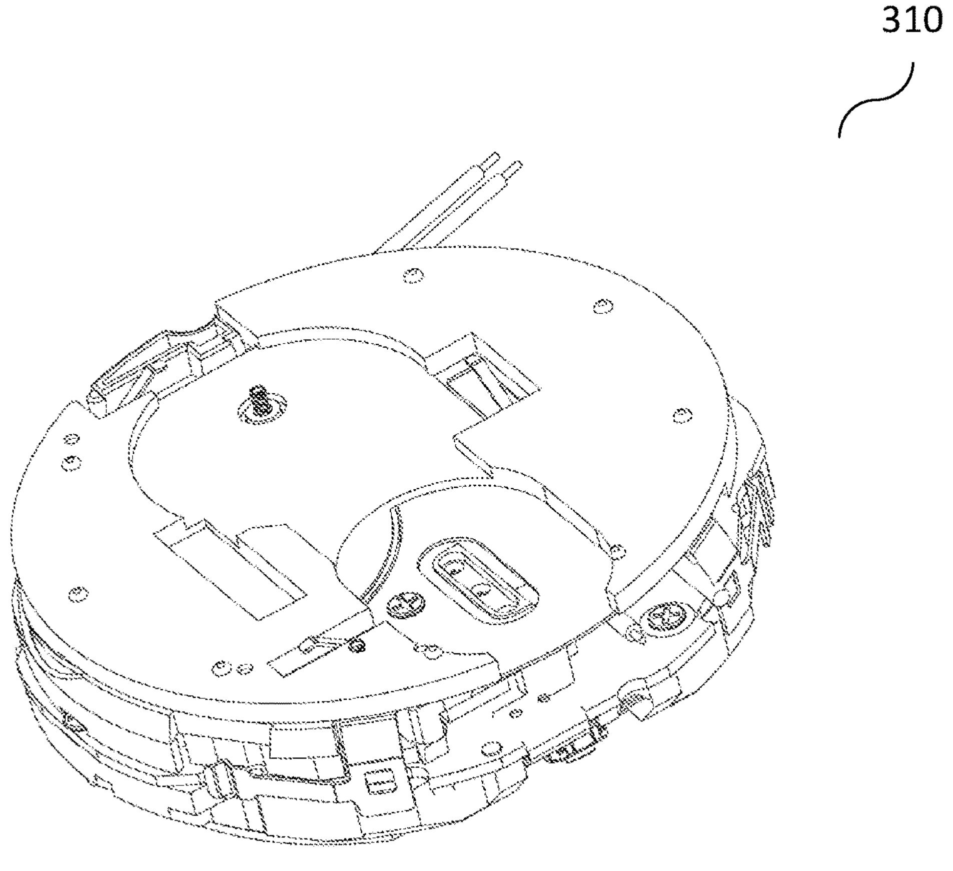
Figure 3E:
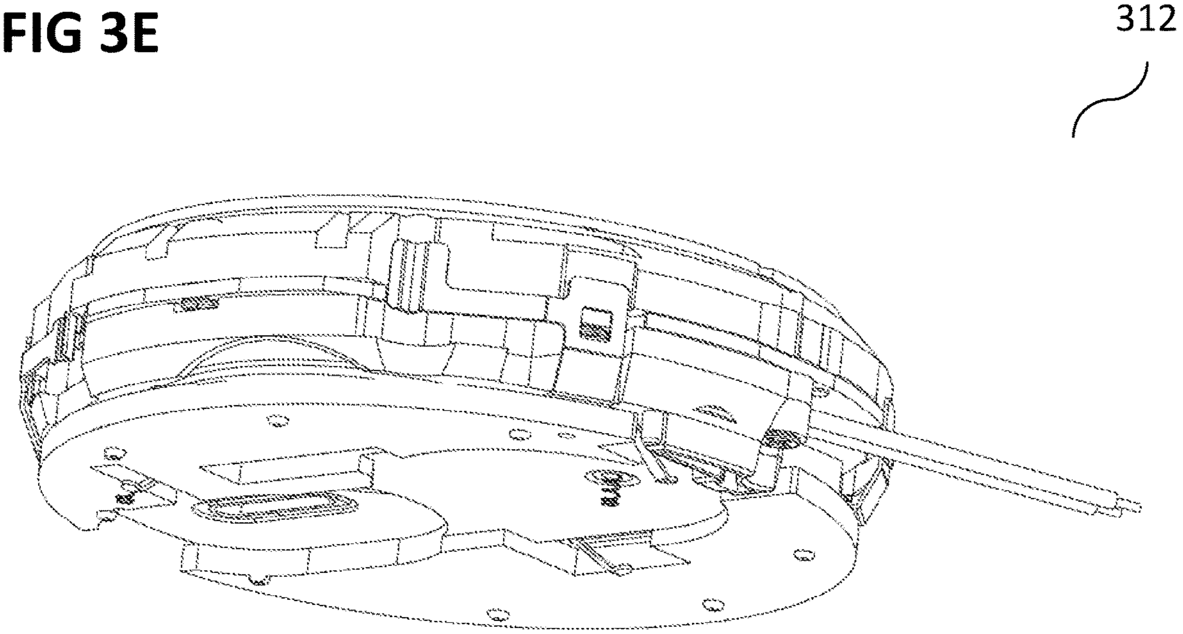
Figure 3F:
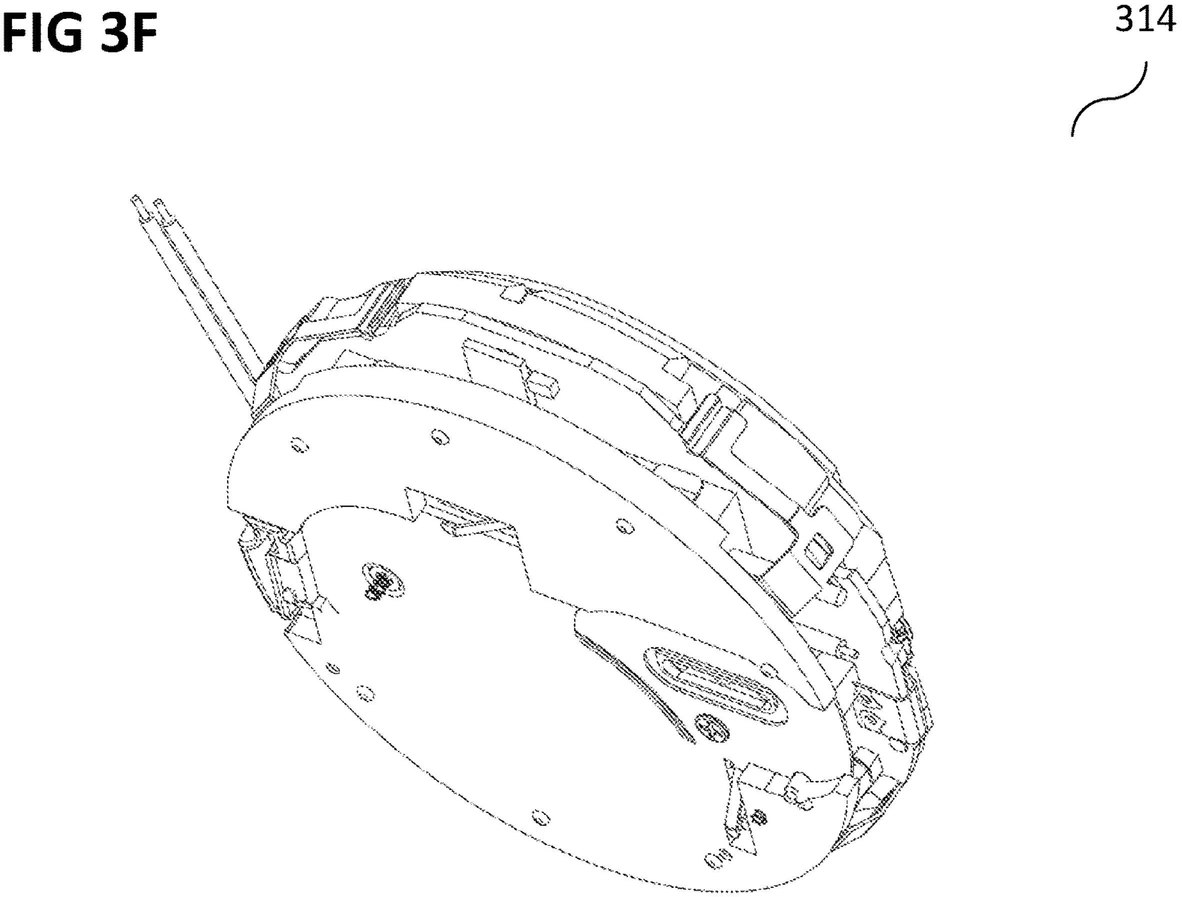

FIG. 3B shows an internal component 304 of the watch 300 with a single panel display according to various embodiments. A single panel LCD 306 is shown.

FIG. 3C, FIG. 3D, FIG. 3E, and FIG. 3F show further 3D (three-dimensional) perspective views 308, 310, 312, and 314 of a single LCD panel according to various embodiments. The content of view 308 corresponds to view 402 of FIG. 4, where the operation of LCD is distinctly split into two portions. A first portion shows the typical watch display using segment LCD method while the a second portion (for example a lower portion) includes (or consists of) display matrix dots where messages can be displayed and scroll horizontally or vertically on this matrix. The example of the shown second portion display matrix is 128×16 pixels, which essentially allows decent message display. Views 310, 312, and 314 show how the display panel being assembled with respect to the inner core of a typical watch/smart watch design.

Figure 4:
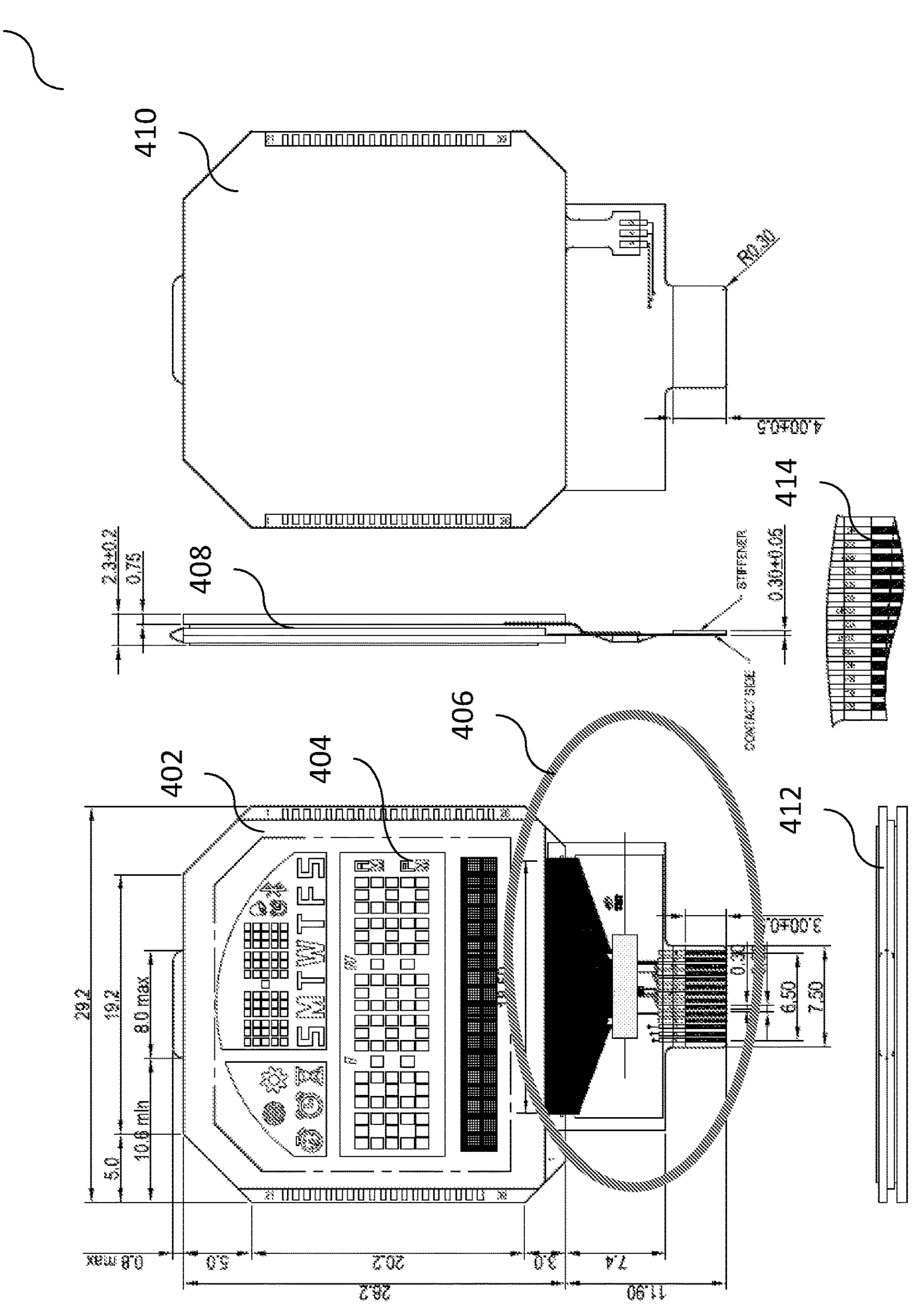
FIG. 4 shows an illustration of various views of an internal component of an internal component of a watch with a dual panel display according to various embodiments.

FIG. 4 shows an illustration 400 of various views of an internal component of an internal component of a watch with a dual panel display 404 according to various embodiments. A front view 402, a side view 408, a back view 410, a top side view 412, and an enlarged view 414 of a contact portion are shown.

According to various embodiments, an integrated single Panel with LED backlight may be provided and may have a thickness of 2.3 mm.

According to various embodiments, a reusable LCD matrix driver COF may be provided while a clock display design may be changed easily.

According to various embodiments, a mixture of LCD drivers may be provided, one with ultra low power for a clock display and another one for fast refresh rate in single panel.

According to various embodiments, better display evenness between watch face and notification display may be provided.

According to various embodiments, LED backlight may be used to improve readability at indoor environment.

According to various embodiments, a stronger inner core support may be provided.

According to various embodiments, a single panel may allow ease of manufacturing, may reduce potential quality/reliability issues as compare to a two panel design.

According to various embodiments, overall height may be reduced by 0.5-1 mm.

According to various embodiments, a reduced panel watch face may be provided.

The following examples pertain to further embodiments.

Example 1 is a wearable device comprising: a display panel comprising integrally formed a first display portion and a second display portion; and a driver circuit configured to control the first display portion with a first frequency and to control the second display portion with a second frequency.

In example 2, the subject-matter of example 1 can optionally include that the driver circuit is configured to provide a first power to the first display portion and a second power to the second display portion, wherein the first power is lower than the second power.

In example 3, the subject-matter of example 2 can optionally include that the first power is in a range of 1 uA to 10 uA.

In example 4, the subject-matter of any one of examples 2 to 3 can optionally include that the second power is in a range of 100 uA to 300 uA.

In example 5, the subject-matter of any one of examples 1 to 4 can optionally include that the first frequency is up to 64 Hz.

In example 6, the subject-matter of any one of examples 1 to 5 can optionally include that the second frequency is in a range of up to 120 Hz.

In example 7, the subject-matter of any one of examples 1 to 6 can optionally include that the first display portion comprises a liquid-crystal display technology.

In example 8, the subject-matter of any one of examples 1 to 7 can optionally include that the second display portion comprises a liquid-crystal display technology.

In example 9, the subject-matter of any one of examples 1 to 8 can optionally include that the second display portion comprises a light-emitting diode technology.

In example 10, the subject-matter of any one of examples 1 to 9 can optionally include that the second display portion comprises an organic light-emitting diode technology.

In example 11, the subject-matter of any one of examples 1 to 10 can optionally include that the driver circuit is integrally formed for the first display portion and the second display portion.

In example 12, the subject-matter of any one of examples 1 to 11 can optionally include that the driver circuit comprises a chip-on-flex or chip-on-glass.

In example 13, the subject-matter of any one of examples 1 to 12 can optionally include that the first display portion and the second display portion are configured to be backlit by a common backlight or dedicated portion.

In example 14, the subject-matter of any one of examples 1 to 13 can optionally include that the first display portion is configured to display a watch function.

In example 15, the subject-matter of any one of examples 1 to 14 can optionally include that the second display portion is configured to display a smart watch function.

Example 16 is a method for manufacturing a wearable device, the method comprising: integrally forming a display panel comprising a first display portion and a second display portion; and forming a driver circuit for controlling the first display portion with a first frequency and for controlling the second display portion with a second frequency.

In example 17, the subject-matter of example 16 can optionally include that the driver circuit is formed to provide a first power to the first display portion and a second power to the second display portion, wherein the first power is lower than the second power.

In example 18, the subject-matter of example 17 can optionally include that the first power is in a range of 1 uA to 10 uA.

In example 19, the subject-matter of any one of examples 17 to 18 can optionally include that the second power is in a range of 100 uA to 300 uA.

In example 20, the subject-matter of any one of examples 16 to 19 can optionally include that the first frequency is up to 64 Hz.

In example 21, the subject-matter of any one of examples 16 to 20 can optionally include that the second frequency is up to 120 Hz.

In example 22, the subject-matter of any one of examples 16 to 21 can optionally include that the first display portion is formed according to a liquid-crystal display technology.

In example 23, the subject-matter of any one of examples 16 to 22 can optionally include that the second display portion is formed according to a liquid-crystal display technology.

In example 24, the subject-matter of any one of examples 16 to 23 can optionally include that the second display portion is formed according to a light-emitting diode technology.

In example 25, the subject-matter of any one of examples 16 to 24 can optionally include that the second display portion is formed according to an organic light-emitting diode technology.

In example 26, the subject-matter of any one of examples 16 to 25 can optionally include that the driver circuit is integrally formed for the first display portion and the second display portion.

In example 27, the subject-matter of any one of examples 16 to 26 can optionally include that the driver circuit is formed according to a chip-on-flex technology or a chip-on-glass technology.

In example 28, the subject-matter of any one of examples 16 to 27 can optionally include that the first display portion and the second display portion are formed to be backlit by a common backlight or dedicated portion.

In example 29, the subject-matter of any one of examples 16 to 28 can optionally include that the first display portion is formed to display a watch function.

In example 30, the subject-matter of any one of examples 16 to 29 can optionally include that the second display portion is formed to display a smart watch function.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A wearable device comprising:

a single display panel comprising integrally formed a first display portion and a second display portion;

the first display portion comprises a liquid-crystal display technology;

the second display portion comprises a light-emitting diode technology or an organic light-emitting diode technology;

a first driver circuit configured to control the first display portion with a first frequency, wherein the first driver circuit is configured to operate the first display portion to display a watch function by segment display method; and a second driver circuit configured to control the second display portion with a second frequency, wherein the second driver circuit is configured to operate the second display portion to display a smart watch function by matrix dots.

2. The wearable device of claim 1, wherein the first driver circuit is configured to provide a first power to the first display portion;

wherein the second driver circuit is configured to provide a second power to the second display portion, wherein the first power is lower than the second power.

3. The wearable device of claim 2, wherein the first power is in a range of 1 uA to 10 uA.

4. The wearable device of claim 2, wherein the second power is in a range of 100 uA to 300 uA.

5. The wearable device of claim 1, wherein the first frequency is up to 64 Hz.

6. The wearable device of claim 1, wherein the second frequency is in a range of up to 120 Hz.

7. The wearable device of claim 1, wherein any one of the first driver circuit and the second driver circuit comprises a chip-on-flex or chip-on-glass.

8. The wearable device of claim 1, wherein the first display portion and the second display portion are configured to be backlit by a common backlight or dedicated portion.

9. A method for manufacturing a wearable device, the method comprising:

integrally forming a single display panel comprising a first display portion and a second display portion;

the first display portion comprises a liquid-crystal display technology;

the second display portion comprises a light-emitting diode technology or an organic light-emitting diode technology;

forming a first driver circuit for controlling the first display portion with a first frequency wherein the first driver circuit is configured to operate the first display portion to display a watch function by segment display method; and forming a second driver circuit for controlling the second display portion with a second frequency, wherein the second driver circuit is configured to operate the second display portion to display a smart watch function by matrix dots.

10. The method of claim 9, wherein the first driver circuit is formed to provide a first power to the first display portion; and wherein the second driver circuit is configured to provide a second power to the second display portion, wherein the first power is lower than the second power.

11. The method of claim 9, wherein any one of the first driver circuit and the second driver circuit is formed according to a chip-on-flex technology or a chip-on-glass technology.

12. The method of claim 9, wherein the first display portion and the second display portion are formed to be backlit by a common backlight or dedicated portion.

* * * * *